United States Patent
Nakamura et al.

(10) Patent No.: US 8,249,617 B2
(45) Date of Patent: Aug. 21, 2012

(54) WIRELESS TERMINAL AND USER INTERFACE METHOD

(75) Inventors: Takatoshi Nakamura, Ibaraki (JP); Yoichiro Sako, Tokyo (JP); Toshiro Terauchi, Tokyo (JP); Masamichi Asukai, Kanagawa (JP); Yasushi Miyajima, Kanagawa (JP); Mitsuru Takehara, Tokyo (JP)

(73) Assignee: Sony Corporation, Tokyo (JP)

( * ) Notice: Subject to any disclaimer, the term of this patent is extended or adjusted under 35 U.S.C. 154(b) by 1216 days.

(21) Appl. No.: 11/918,834

(22) PCT Filed: Apr. 4, 2006

(86) PCT No.: PCT/JP2006/307119
§ 371 (c)(1),
(2), (4) Date: Oct. 19, 2007

(87) PCT Pub. No.: WO2006/114996
PCT Pub. Date: Nov. 2, 2006

(65) Prior Publication Data
US 2009/0098881 A1    Apr. 16, 2009

(30) Foreign Application Priority Data

Apr. 20, 2005  (JP) ................................. 2005-122360

(51) Int. Cl.
*H04W 24/00*    (2009.01)
(52) U.S. Cl. ............... 455/456.1; 455/456.3; 455/456.6; 455/457; 455/421
(58) Field of Classification Search ............... 455/456.1, 455/456.3, 457, 456.6
See application file for complete search history.

(56) References Cited

U.S. PATENT DOCUMENTS

| 6,226,589 B1 | 5/2001 | Maeda et al. |
| 2002/0183052 A1 | 12/2002 | Tachikawa |
| 2003/0186716 A1 * | 10/2003 | Dorenbosch et al. ......... 455/519 |

(Continued)

FOREIGN PATENT DOCUMENTS

EP    1 482 321 A2    12/2004

(Continued)

OTHER PUBLICATIONS

Kazumi et al., JP 2003-284124 Published Mar. 10, 2003—English translation of the Abstract Page.*

*Primary Examiner* — Kamran Afshar
*Assistant Examiner* — Manpreet Matharu
(74) *Attorney, Agent, or Firm* — Wolf, Greenfield & Sacks, P.C.

(57) ABSTRACT

Communications is executed between users through wireless terminals thereof without fear of being located by each other. On terminal 1*x*, area 4 in which wireless communication is enabled with terminal 1*x* is divided into proximity area 6 and external area 7 and the radius (distance between boundary 5 and terminal 1*x*) is temporally varied by random number. A control block of terminal 1*x* detects terminals located in side the communicable area 4 and in the communication enabled state and processes the other terminals located inside proximity area 6 as out-of-service-area among the detected other terminals, not displaying the users of these other terminals located inside proximity area 6 onto display screen 2*x*. The control block processes only other terminals located inside external area 7 as in-service area and displays the users of these other terminals onto display screen 2*x*.

17 Claims, 15 Drawing Sheets

U.S. PATENT DOCUMENTS

2004/0203902 A1* 10/2004 Wilson et al. .............. 455/456.1
2006/0223518 A1* 10/2006 Haney .......................... 455/420

FOREIGN PATENT DOCUMENTS

| | | |
|---|---|---|
| JP | 10-170625 | 6/1998 |
| JP | 2000-167233 A | 6/2000 |
| JP | 2002-016956 A | 1/2002 |
| JP | 2002-259251 A | 9/2002 |
| JP | 2003-087847 A | 3/2003 |
| JP | 2003-092778 A | 3/2003 |
| JP | 2003-161771 A | 6/2003 |
| JP | 2003-259425 A | 9/2003 |
| JP | 2003-284124 A | 10/2003 |
| JP | 2004-173260 A | 6/2004 |
| JP | 2004-201031 A | 7/2004 |
| WO | 2005/083956 A1 | 9/2005 |

* cited by examiner

WIRELESS TERMINAL AND USER INTERFACE METHOD

CROSS REFERENCES TO RELATED APPLICATIONS

The present invention claims priority under 35 U.S.C. 371 and 37 CFR 1.495 to International Application Serial No. PCT/JP06/307119, filed Apr. 4, 2006, which, in turn, claims priority under 35 U.S.C. §119 to Japanese Patent Application No. JP 2005-122360, filed in the Japanese Patent Office on Apr. 20, 2005, the entire contents of which being incorporated herein by reference.

TECHNICAL FIELD

The present invention relates generally to a wireless terminal and a user interface method thereon.

BACKGROUND ART

As known as "ad-hoc network", a system is considered in which a plurality of users in a certain range form a wireless network with wireless terminals carried by these users and transmit messages (or mail message) and music data, for example, to each other, thereby implementing communication among the users.

Referring to FIG. 15, there is shown an outline of this wireless network system. A terminal 1x is carried by user X, a terminal 1a is carried by user A, a terminal 1b is carried by user B, a terminal 1c is carried by user C, and terminal 1d is carried by user D, each being a wireless terminal. The terminals 1a, 1b, and 1c are located in an area 4 enclosed by a circular boundary 3 with the terminal 1x at the center thereof. The terminal ld is located outside the boundary 3.

The boundary 3 is located farthest from the terminal 1x, for example, from which radio wave reaches for wireless communication. Namely, any terminal of which distance from the terminal 1x is below predetermined distance Dx can communicate with the terminal 1x.

Therefore, in the example shown in FIG. 15, users A, B, and C of the terminals 1a, 1b, and 1c, respectively, are displayed as in-service-area user on a display screen 2x of the terminal 1x, in the nicknames attached to the terminals, as shown in the bottom of the figure.

User x of the terminal 1x can select a mate of chat, for example, from among the users in the service area to communicate with the selected mate, such as transmitting messages to the selected user, exchanging messages with the selected mate, transmitting music data recorded to the terminal 1x to the selected mate, and receiving music data recorded to the terminal of the selected mate, for example.

Patent Document 1 (Japanese Patent Laid-open No. 2004-135086) below discloses a method of getting the positional information of a mobile wireless terminal in a communications system having a base station wirelessly communicable with a mobile wireless terminal without requiring a dedicated server or a dedicated line.

Patent Document 2 (Japanese Patent Laid-open No. 2003-219453) discloses a method of managing the location of each user while protecting the privacy of each user in a location management system made up of a server and wireless terminals carried by users, which is installed in an office, for example.

However, in the above-mentioned related-art method shown in FIG. 15, a display screen 2x of the terminal 1x shows all of users A, B, and C as in-service-area users who are communicable inside a communicable area 4. Hence, if user X selects user B to execute chat between user X and user B, for example, and, if user B is in the proximity of user X, in front of user X, for example, the locations user X and user B can be found out by each other.

The above-mentioned prior-art technical documents are as follows:
Japanese Patent Laid-open No. 2004-135086
Japanese Patent Laid-open No. 2003-219453

DISCLOSURE OF THE INVENTION

It is therefore an object of the present invention to provide communication through wireless terminals carried by users in a manner in which the privacy of each user is protected because the location of each user is not identified.

In carrying out the invention and according to a first embodiment thereof, there is provided a user interface method for use on one terminal with which another terminal transmits and receives information, the user interface method including:

a first step configured to detect another terminal located inside a communicable area communicable with the terminal;

a second step configured to determine whether the another terminal detected in the first step is located within a proximity area of the terminal in the communicable area and located within an area external to the proximity area in the communicable area; and a third step configured to display another terminal located in the external area onto a display screen of the terminal as in-service area and process another terminal located inside the proximity area as out-of-service area.

In carrying out the invention according to a second embodiment thereof, there is provided a user interface method on a terminal with which another terminal transmits and receives information in a wireless communication manner. This user interface method includes:

a first step configured to detect another terminal located inside a communicable area communicable with the terminal; and a second step configured to process, of the other terminals detected in the first step, N other terminals (N being a positive integer) near the terminal as out-of-service-area and display remaining other terminals onto a display screen of the terminal as in-service-area.

In the above-mentioned first or second user interface method, even if other terminals are located inside the communicable area, the users of other terminals located inside the proximity area of a particular terminal or N other terminals near thereto are not displayed on a display screen of that particular terminal, so that it appears that the other terminals be disconnected from the network relative to that particular terminal.

Therefore, the user concerned (or he user of that particular terminal) and other users nearby cannot select each other as a mate of chat for example, so that the locations of these users cannot be known by each other.

As described and according to the invention, the location of each user cannot be known for the protection of privacy while maintaining communication between users through wireless terminals thereof.

BEST MODE FOR CARRYING OUT THE INVENTION

Figure 1:
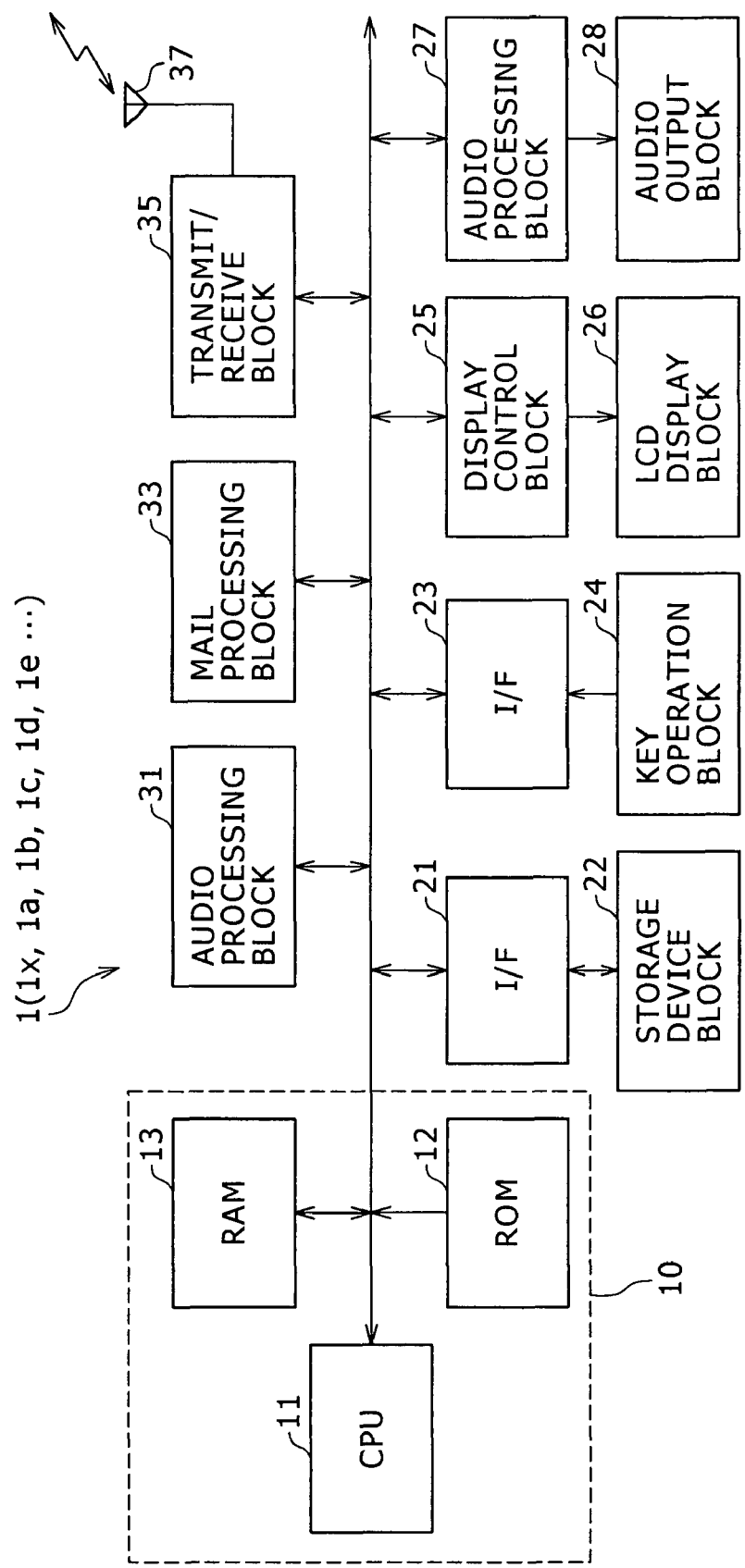
FIG. 1 illustrates one example of a wireless terminal according to the invention.

1. Embodiments of Wireless Terminals: FIG. 1

Now, referring to FIG. 1, there is shown one example of a wireless terminal according to the present invention.

Terminal 1 of this example has a CPU 11, a ROM 12 storing programs and data, a RAM 13 in which programs and data are developed, which are interconnected via a bus 14. The CPU 11, the ROM 12, and the RAM 13 form a control block 10, which controls the other component blocks of the terminal 1 and, at the same time, executes the processing for the user interfacing to be described later.

The bus 14 is connected with a storage device block 22 via an interface 21, with a key operation block 24 via an interface 23, with an LCD display block 26 via a display control block 25, and with an audio output block 28 via an audio processing block 27.

The storage device block 22 is a built-in or removable storage device in which content data, such as music data, and programs are stored. The LCD display block 26 displays a in-service-area user list which will be described later. The audio processing block 27 executes audio processing, such as music reproduction on the terminal 1. The audio output block 28 is a headphone connected to the terminal 1 and a loudspeaker arranged on the terminal 1.

Further, the bus 14 is connected with an audio processing block 31, a mail processing block 33, and transmit/receive block 35 that is connected to an antenna 37.

The audio processing block 31 processes audio data, such as music data to be transmitted to another terminal, for example. The mail processing block 33 creates mail (or messages) and processes the created mail. The transmit/receive block 35 and the antenna 37 execute wireless communication with another terminal.

The terminal 1 thus configured is assigned with an address for uniquely identifying the terminal 1 on a network and given a user nickname by the user, for example.

2. A First Embodiment of the User Interface Method: FIGS. 2 Through 12

Figure 2:
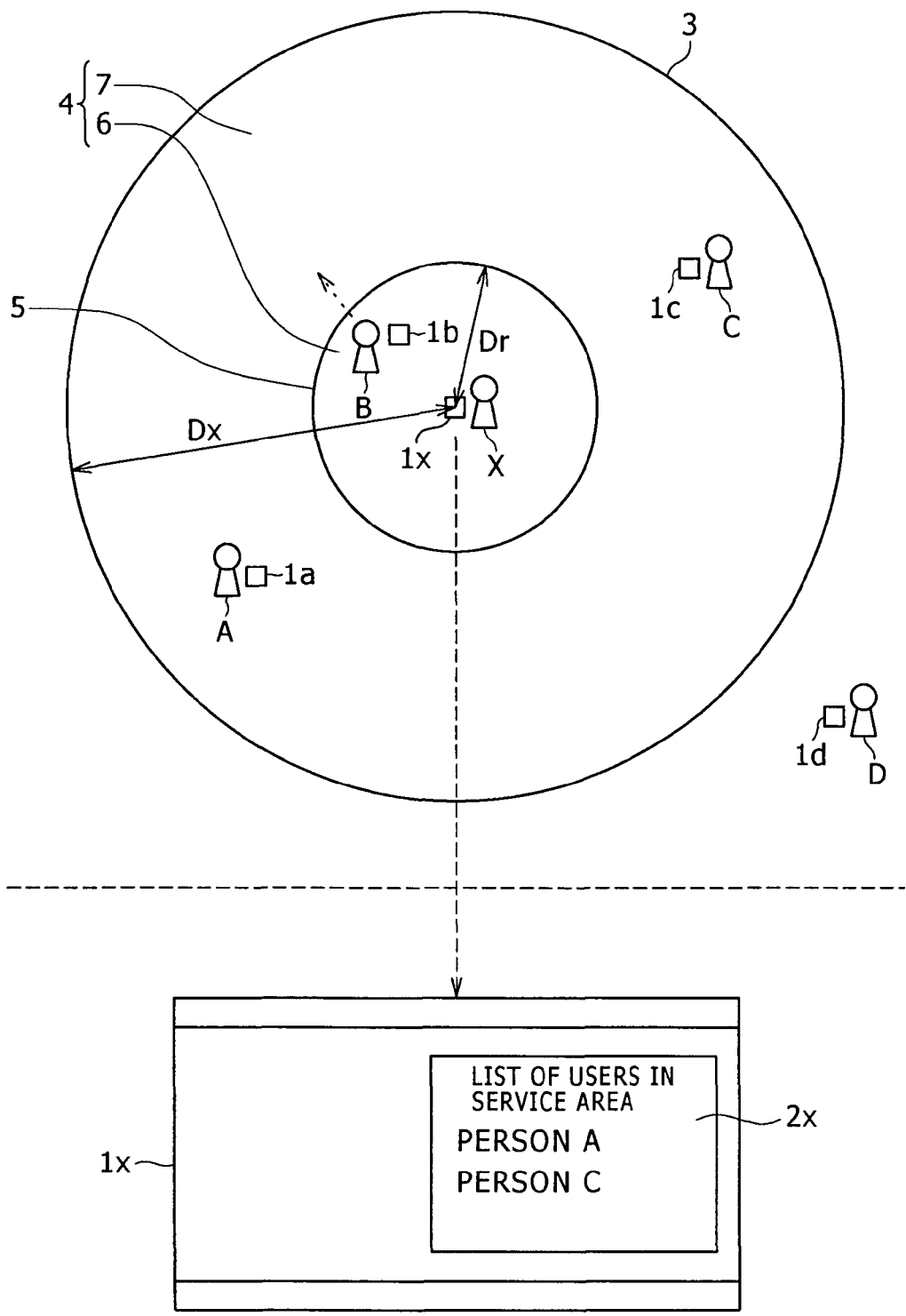
FIG. 2 illustrates one example of a user interface method.

In the user interface method practiced as the first embodiment of the invention, the communicable area 4 inside the boundary 3 is divided into a proximity area 6 and an external area 7 by a boundary 5 as shown in FIG. 2.

The boundary 3 is the farthest from the terminal $1x$ but radio wave is reachable and therefore wirelessly communicable in between. The boundary 3 is circular as long as a radio wave propagation condition is the same in each direction, radio Dx thereof being about 100 to 300 meters. The boundary 5 is also circular, radius Dr being about 10 meters.

However, the boundary 3 may only be inside (namely, the side nearer to the terminal $1x$) the farthest position in which radio wave is reachable, namely, $Dx \leqq Dxa$, where distance from the terminal $1x$, the farthest position at which radio wave is reachable, is Dxa. The boundary 5 is nearer to the terminal $1x$ than the boundary 3, namely, $Dr<Dx$.

In the example shown in FIG. 2, terminals $1a$, $1b$, and $1c$ are located inside the communicable area 4, only the terminal $1b$ being located inside the proximity area 6, the terminals $1a$ and $1c$ being located inside the external area 7.

The terminals $1x$, $1a$, $1b$, $1c$, and $1d$ are wireless terminals as shown in FIG. 1. The terminals $1a$, $1b$, and $1c$ transmits and receives commands in between to form a network with the terminal $1x$, the existences of the terminals $1a$, $1b$, and $1c$ and the distances thereof from the terminal $1x$ being detected by the terminal $1x$.

2-1. A First Example: FIGS. 2 Through 6

In the user interface method according to the first embodiment, in the example of FIG. 2, as a first example, the display screen $2x$ of the terminal $1x$ shows, in the bottom area of the figure, only users A and C of the terminals $1a$ and $1c$ as in-service-area users (users selectable as the mates of communication) and the terminal $1b$ is handled as out of service area and therefore user B of the terminal $1b$ is not shown.

Therefore, user X and user B located near user X cannot select each other as a mate of chat, for example, and the location of each other cannot be known.

User A and user C are located apart from user X more than a certain distance, so that, is a chat, for example, is executed between user X and user A or user C, the location of user X cannot be known by user A or user C and the location of user A or user C cannot be known by user X.

Figure 3:
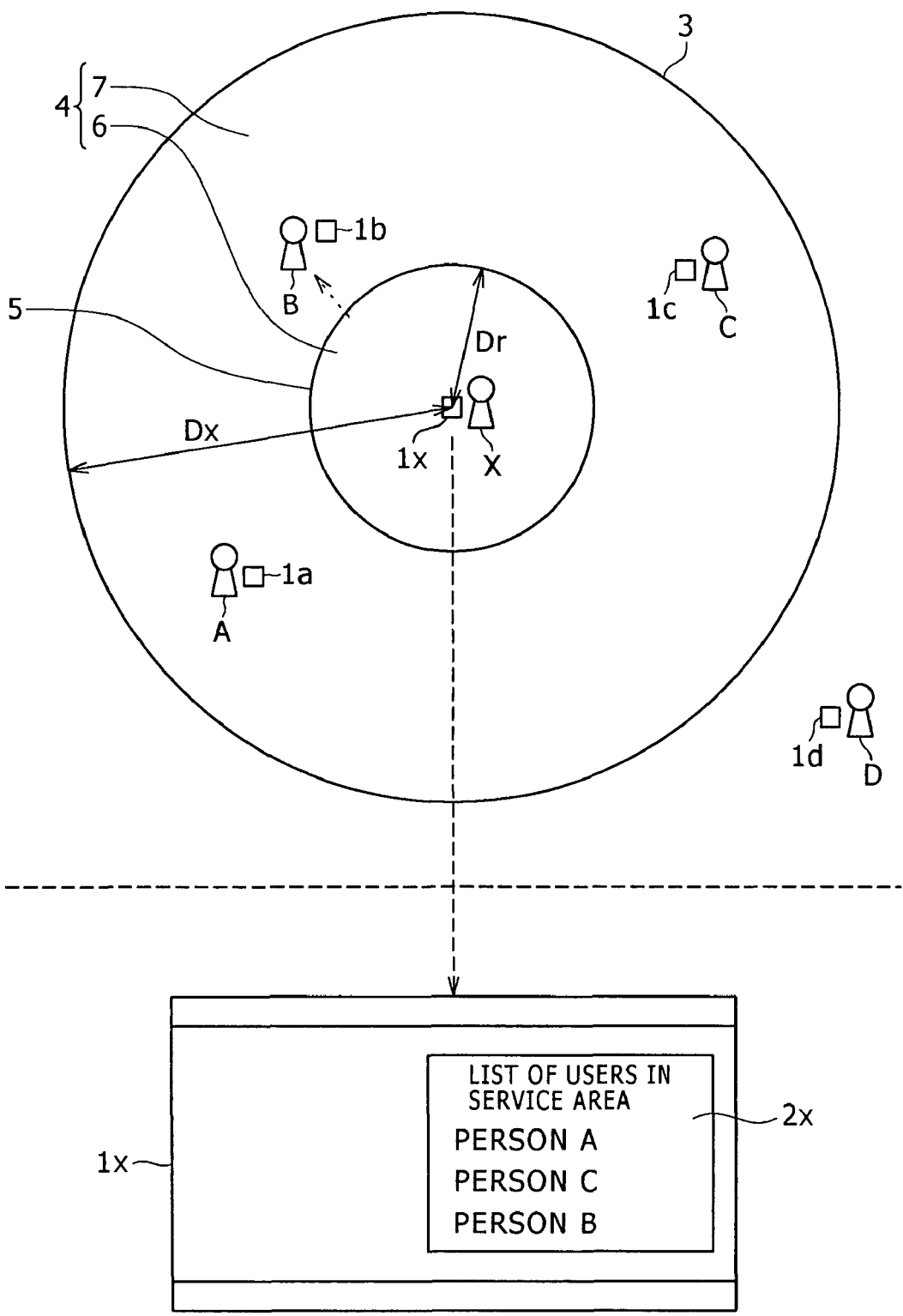
FIG. 3 illustrates an example in which a user has moved in the user interface method in the example shown in FIG. 2.

However, if user B moves from inside the proximity area 6 into the external area 7 as indicated by a dashed line in FIGS. 2 and 3 in the situation shown in FIG. 2, user B is shown on the display screen $2x$ of the terminal $1x$ as shown in the bottom of FIG. 3, so that the locations of user X and user B may be known by each other.

If user A or user C moves from inside the external area 7 into the proximity area 6 in the situation shown in FIG. 2, user A or user C is not shown on the display screen $2x$ of the terminal $1x$ and user X is not shown on the display screen of the terminal $1a$ or $1c$, so that the locations of user X and user A or C may be known by each other.

Therefore, it is desirable for distance (radius) Dr, namely, the position of the boundary 5 between the proximity area 6 and the external area 7, to be temporally variable in the direction of radius around the terminal $1x$. Especially, as shown in FIG. 4, it is desirable to provide this variation on the basis of a random number for each terminal.

Figure 4:
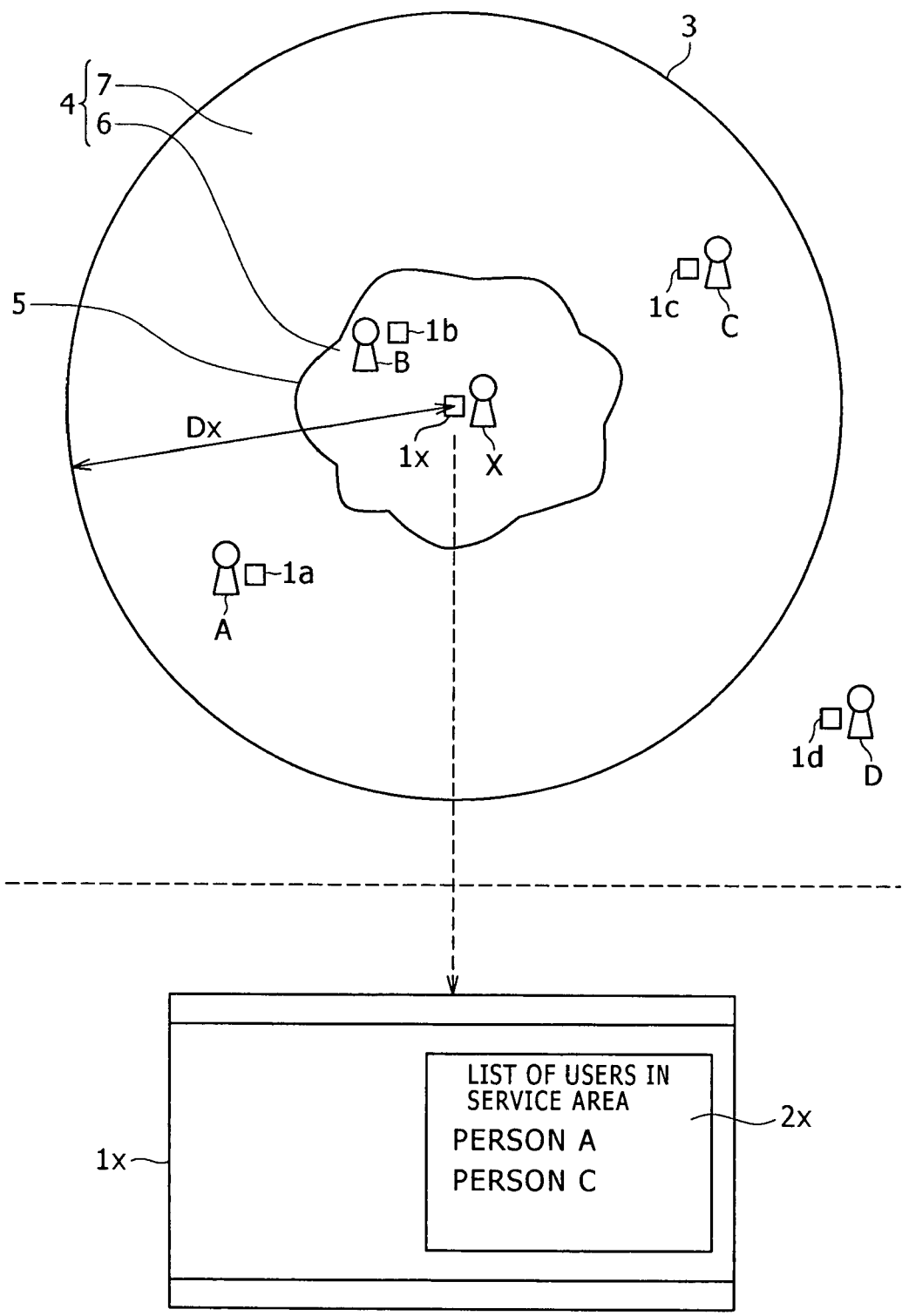
FIG. 4 illustrates one example of a user interface method.
Figure 5A:
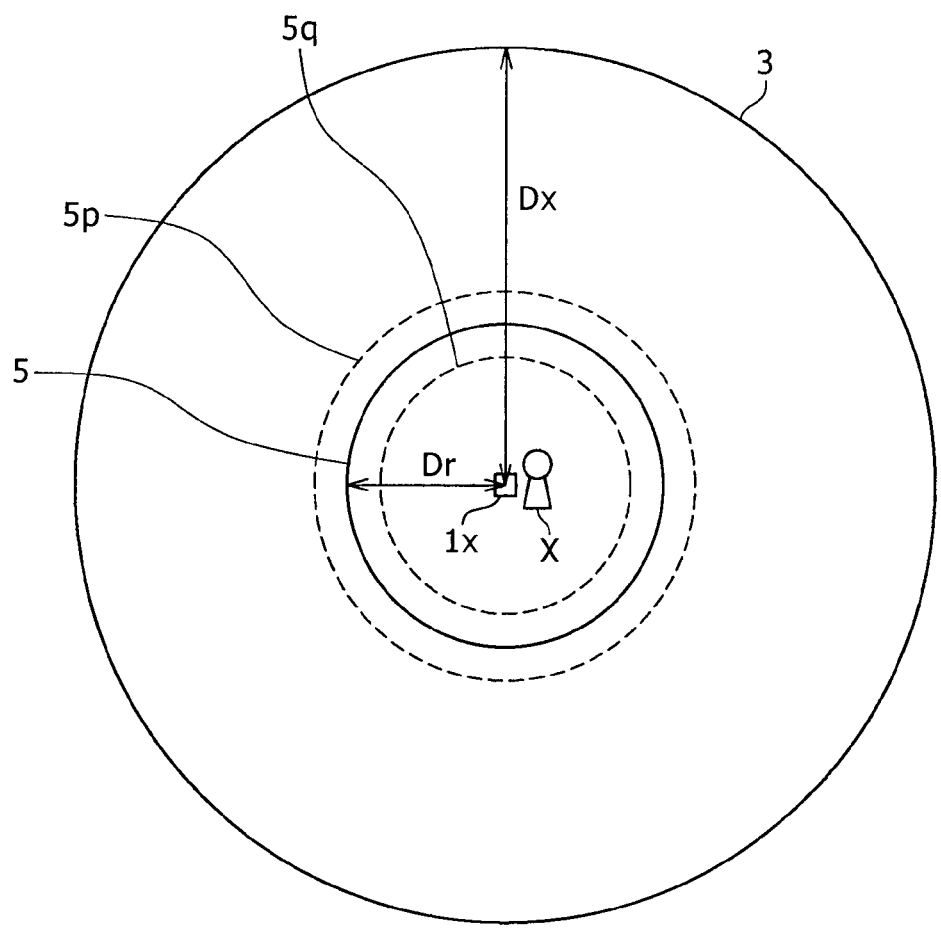
FIG. 5A illustrates the user interface method of the example shown in FIG. 4.
Figure 5B:
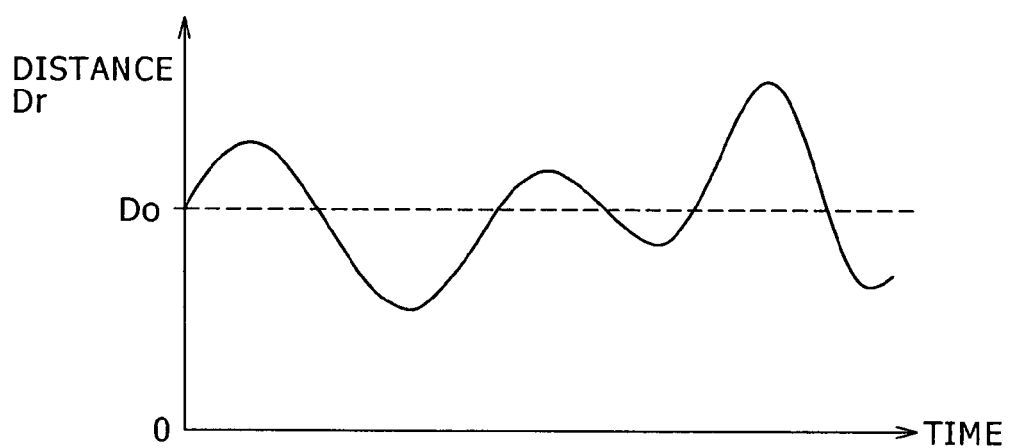
FIG. 5B illustrates the user interface method of the example shown in FIG. 4.

FIG. 4 schematically shows changes of the proximity area 6 and the external area 7; actually, as shown in FIG. 5A, the boundary 5 is changed to the outside as indicated by dashed line $5p$ at one point of time, to an intermediate position as indicated by a solid line at another point of time, and to the inside as indicated by dashed line $5q$ at still another point of time. Distance Do shown in FIG. 5B is distance Dr when the boundary 5 is at the position of indicated by the solid line of FIG. 5A.

According to the above-described method, when a user moves from inside the proximity area 6 into the external area 7 or from the external area 7 into the proximity area 6 and, if the display of in-service-area user changes on the display screen 2x of the terminal 1x and on the display screen of the moving user, the proximity area 6 and the external area 7 themselves change on the terminal 1x and the proximity area and the external area themselves have been changed on the terminal of the moving user, so that the locations of the user X and the moving user cannot be known by each other.

Figure 6:
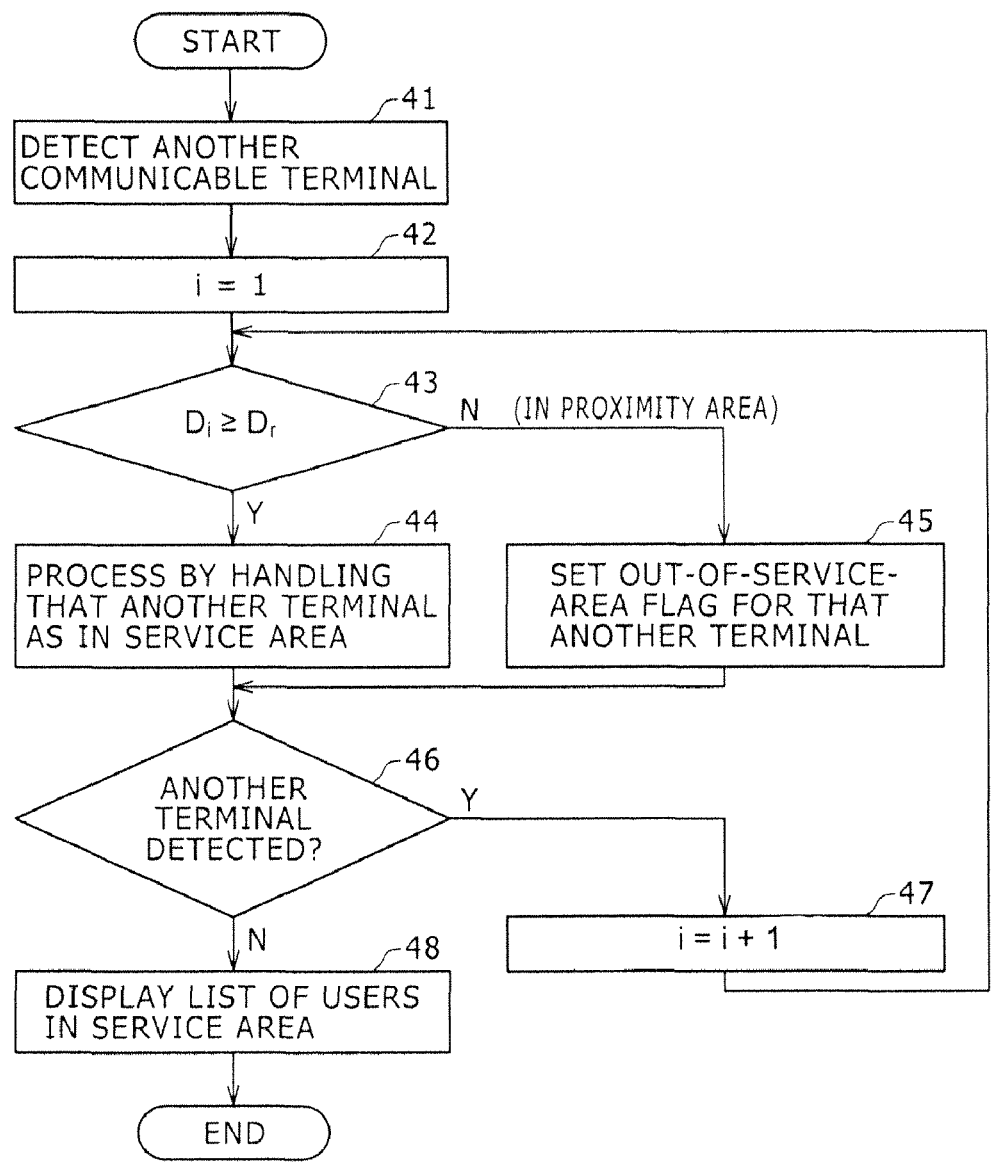
FIG. 6 illustrates a processing routine of the user interface method of the example shown in FIG. 2 or FIG. 4.

Referring to FIG. 6, there is shown one example of the above-described user interface processing that is executed by the control block 10 of the terminal 1x configured as FIG. 1.

First, the control block 10 of the terminal 1x transmits a command to another terminal in step 41 and receives a command from another terminal in response or receives a command from another terminal on its own initiative and transmits a command to another terminal in response, thereby detecting another terminal communicable with the own terminal (namely, the terminal 1x), namely, another terminal located inside the communicable area 4 shown in FIGS. 2 through 4 and enabled for communication (namely, the power to that another terminal is turned on).

At this moment, the control block 10 of the terminal 1x detects not only the location of another terminal but also the distance between the own terminal (the terminal 1x) and another terminal by measuring the receiving electric field intensity.

The control block 10 of the terminal 1x goes to step 42 to set number i for detected another terminal to 1. Number i is set sequentially in the order of detection or in the ascending order or descending order of the distance between the own terminal (the terminal 1x) and the detected another terminal.

Next, the control block 10 of the terminal 1x determines in step 43 whether distance Di between i-th another terminal and the own terminal (the terminal 1x) is equal to or greater than distance Dr that is the radius of the proximity area 6. Distance Dr is variable by a random number, for example, as described above.

Then, if the determination is Di≧Dr, the control block 10 of the terminal 1x determines that the this (i-th) another terminal is located in the external area 7 and goes from step 43 to step 45 to set a out-of-service-area flag to that another terminal, proceeding to step 46.

On the other hand, if the determination is Di<Dr, then the control block 10 of the terminal 1x determines that the this (i-th) another terminal is located in the proximity area 6 and goes from step 43 to step 45 to set a out-of-service-area flag to this another terminal, proceeding to step 46.

In step 46, the control block 10 determines whether there is still another terminal detected. If still another terminal is found, then the control block 10 goes to step 47 to increment number i by 1 and then returns to step 43 to repeat the above-mentioned processing on the i-th another terminal after increment.

If there is no another terminal detected, then the control block 10 goes from step 46 to step 48 to display a in-service-area user list on the display screen 2x on the basis of the results of processing executed so far.

The above-mentioned user interface processing is repeatedly executed at certain time intervals.

If there are only a few users, 1 to 3 for example, in the communicable area 4, the locations of user X and another user may be easily known by each other even if these users are away from each other.

If the number of other terminals detected in step 41 is less than a predetermined number, 3 or lower for example, the processing routine of the user interface may be configured so as to process all the other terminals as out of service area.

Alternatively, the terminal 1x (or each terminal) may be configured so as to process all other terminals as out of service area by user X by setting the terminal 1x to the out-of-service area mode, depending on the situation.

2-2. A Second Example (Out-Of-Service Area Specified, In-Service-Area Specified, and Rejected Communication Setting): FIGS. 7 Through 12

A user may not want the location thereof to be known by other particular users or general users or may want the location to be known by these other users.

In such cases, it is preferable to configure each wireless terminal and the wireless network system so as to execute the processing as specified by the user on the terminal thereof as described below.

Figure 7:
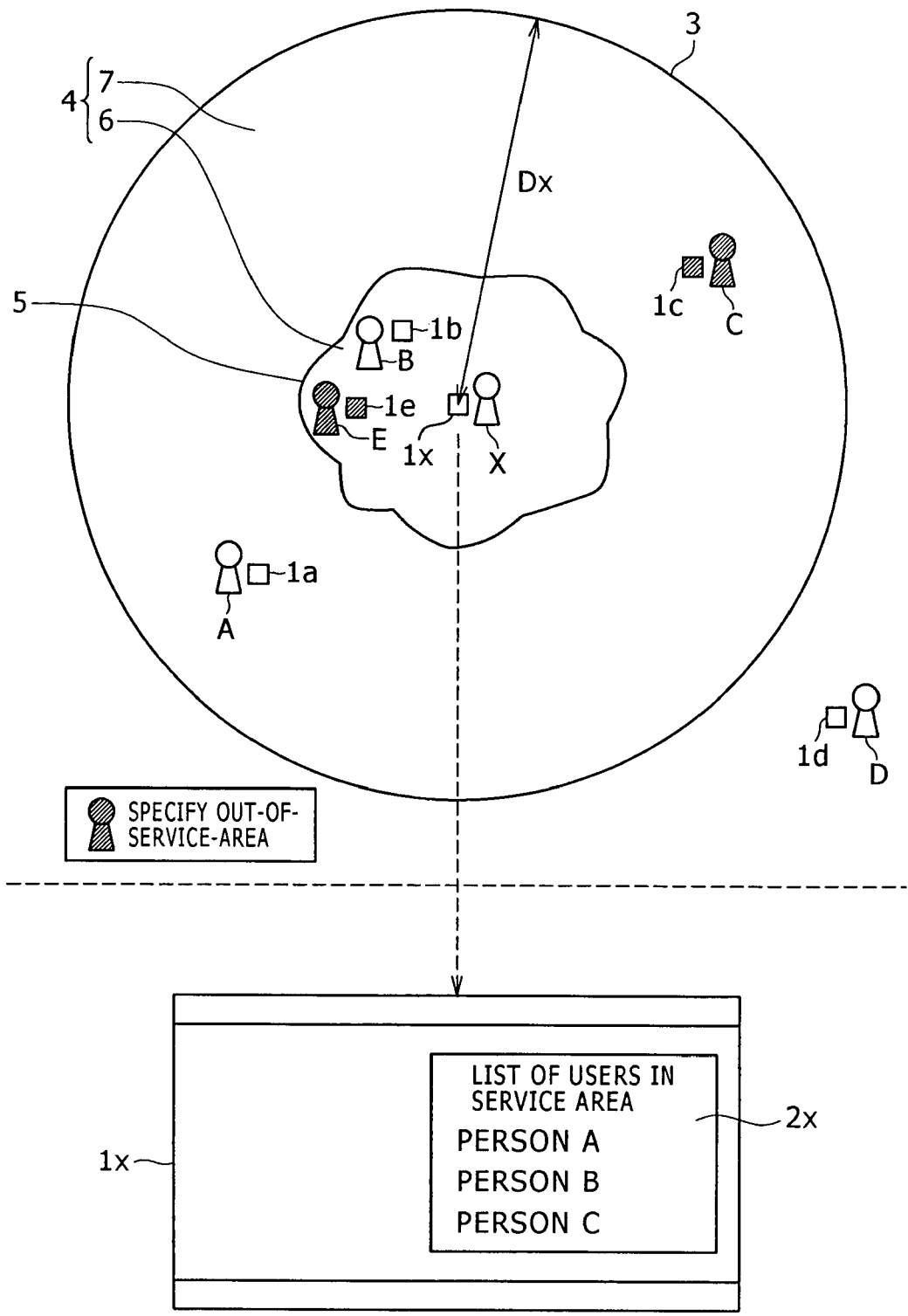
FIG. 7 illustrates one example of a user interface.
Figure 8:
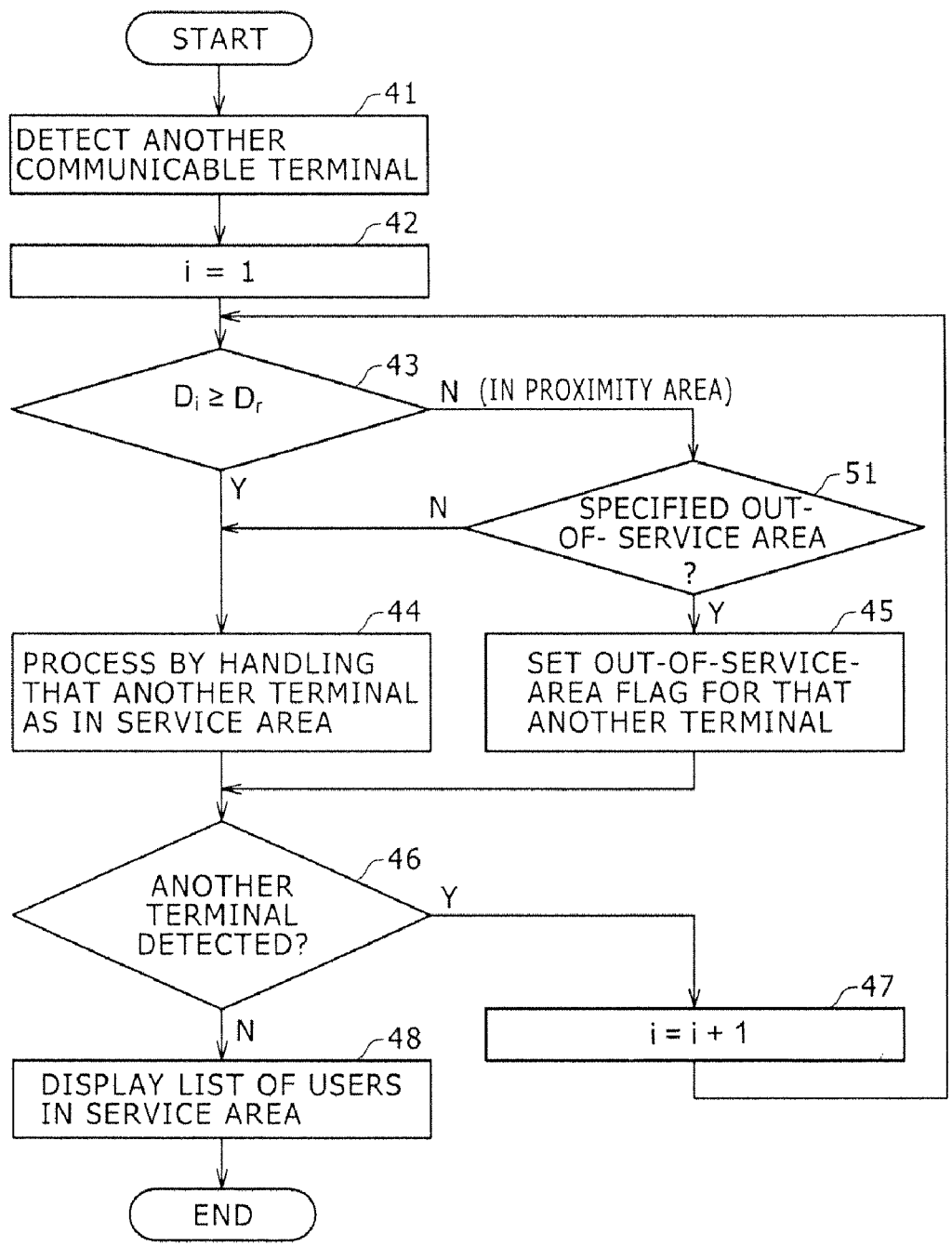
FIG. 8 illustrates a processing routine of the user interface method shown in FIG. 8.

2-2-1 Out-Of-Service-Area Specified: FIGS. 7 and 8

In a first case, a user (or a terminal) is out-of-service-area specified.

In this case, the terminal 1x processes, as out-of-service area, another terminal located in the proximity area 6 if this another terminal is out-of-service-area specified; if this another terminal is not a terminal out-of-service-area specified, then the terminal 1x processes this another terminal as in-service area as the same as other terminals in the external area 7.

Either of two methods of specifying out-of-service-area is available. In method (1A), the user of another terminal specifies himself (or the own terminal) as out-of-service-area on another terminal. In method (1B), user X specifies particular another terminal as out-of-service-area on the terminal 1x in advance.

In the case of method (1A), receiving out-of-service-area information from this another terminal, the terminal 1x detects that this another terminal is a terminal with out-of-service-area specified. In the case of method (1B), comparing the terminal address or user ID (identification) received from another terminal with the out-of-service-area information on the terminal 1x, the terminal 1x determines whether this another terminal is a terminal with out-of-service-area specified.

FIG. 7 shows one example of the above-mentioned case. In this example, terminals 1a, 1b, 1c and 1e are located inside the communicable area 4, the terminals 1b and 1e are located inside the proximity area 6, and the terminals 1a and 1c are located inside the external area 7. The terminal 1c (user C) and the terminal 1e (user E) are out-of-service-area specified depending on at least the relationship with the terminal 1x (user X) as indicated darkening.

In this case, because the terminal 1a and the terminal 1c are located in the external area 7, user A and user C are out of service area regardless of the specification of out-of-service-area. The terminal 1b is located in the proximity area 6 but not specified with out-of-service-area, so that user B is in the service area. The terminal 1e is located in the proximity area 6 and specified with out-of-service-area, so that user E is out of service area.

Therefore, as shown in the bottom of FIG. 7, the display screen 2x of the terminal 1x shows user A, user B and user C as users in service area. With other users located in the proximity area 6, user X cannot execute a chat for example with user E but can execute a chat for example with user B.

FIG. 8 shows one example of the user interface processing to be executed by the control block 10 of the terminal 1x configured as shown in FIG. 1 when out-of-service-area is specified as described above.

The processing operations of step 41 through step 43 are the same as those of the example shown in FIG. 6. The processing to be executed when the determination in step 43 is Di≧Dr is the same as that of the example shown in FIG. 6. The processing operations of step 46 and subsequent steps are also the same as those of the example shown in FIG. 6.

In the example shown in FIG. 8, if Di<Dr is determined in step 43, namely, if this another terminal is found located in the proximity area 6, then the control block 10 of the terminal 1*x* goes to step 51 to determine whether this another terminal is specified with out-of-service-area.

If this another terminal is found specified with out-of-service-area, then the control block 10 goes from step 51 to step 45 to set an out-of-service-area flag to this another terminal, upon which the control block 10 goes to step 46.

In contrast, if this another terminal is found not specified with out-of-service-area, the control block 10 goes from step 51 to step 44 to process this another terminal as in-service-area in the same manner as when Di≧Dr was determined in step 43, upon which the control block 10 goes to step 46.

Figure 9:
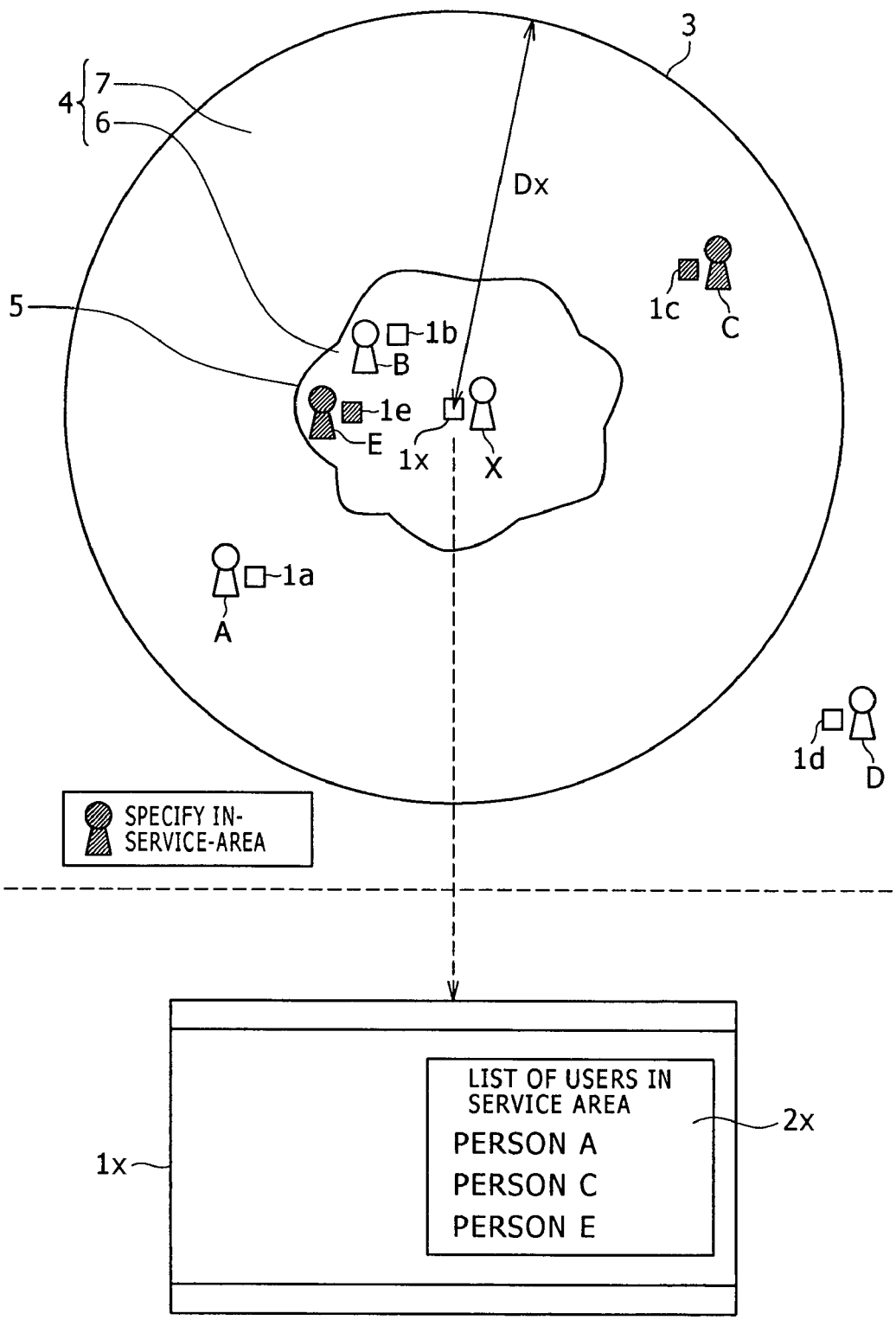
FIG. 9 illustrates one example of a user interface method.
Figure 10:
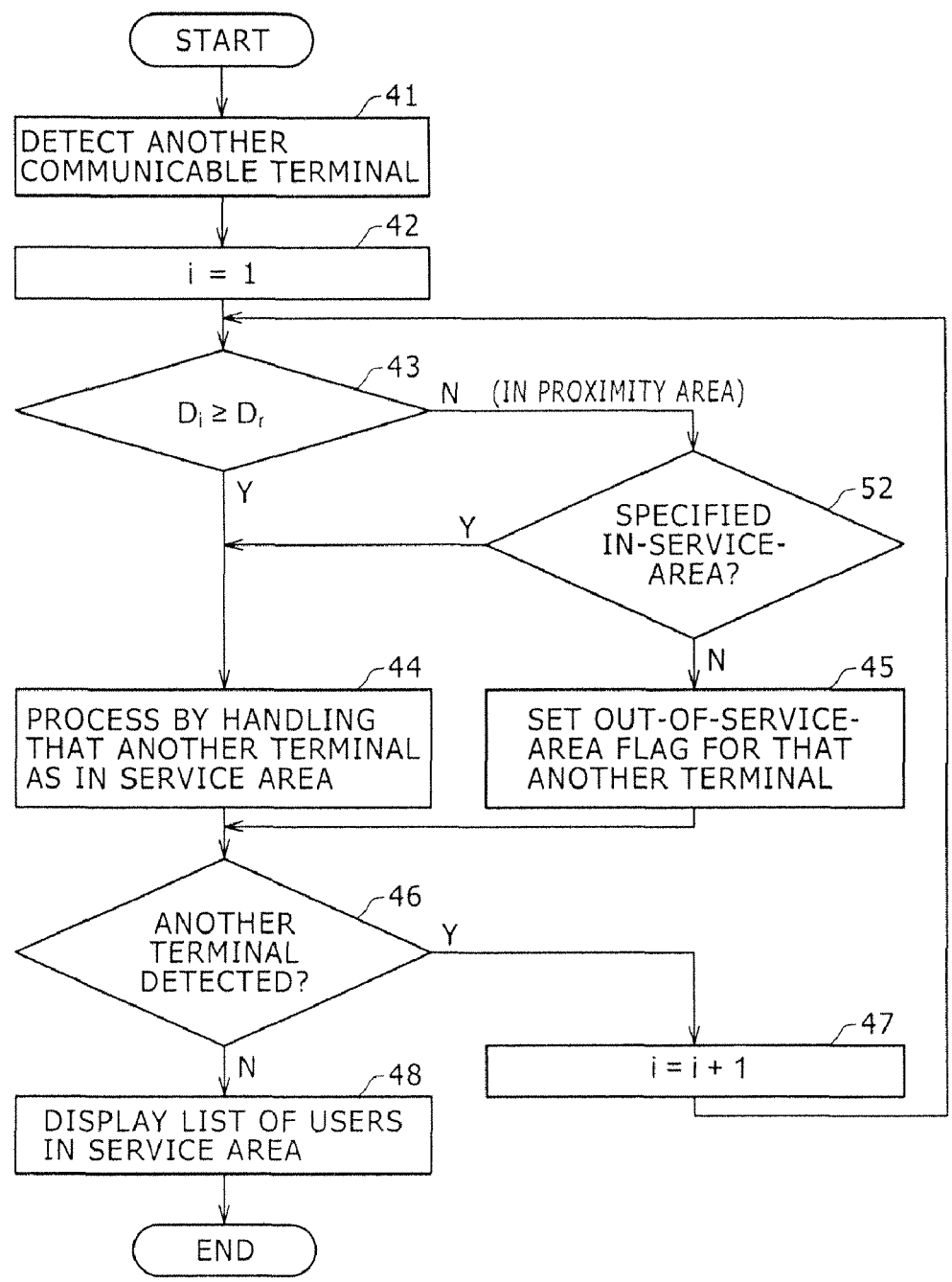
FIG. 10 illustrates a processing routine of the user interface method of FIG. 9.

2-2-2. In-Service-Area Specified: FIGS. 9 and 10

In the second case, a certain user (or terminal) is specified with in-service-area. For example, in this case, users X, C and E are friends and therefore the locations thereof may be known by each other.

In such a case, the terminal 1*x* processes another terminal located in the proximity area 6 as out-of-service area if this another terminal is not a terminal specified with in-service-area; if this another terminal is a terminal specified with in-service-area, the terminal 1*x* processes this another terminal as in-service-area as with another terminal located in the external area 7.

As with the above-described methods of out-of-service area specification, either of two methods of specifying in-service-area is available. In method (2A), the user of another terminal specifies himself (or the own terminal) as in-service-area on another terminal. In method (2B), user X specifies particular another terminal as in-service-area on the terminal 1*x* in advance.

In the case of method (2A), receiving in-service-area information from this another terminal, the terminal 1*x* detects that this another terminal is a terminal specified with in-service area; in the case of method (2B), comparing the terminal address of user ID (identification) received from another terminal with the in-service-area information on the terminal 1*x*, the terminal 1*x* determines whether this another terminal is a terminal specified with in-service-area.

FIG. 9 shows one example of the above-mentioned case. In this example, terminals 1*a*, 1*b*, 1*c* and 1*e* are located inside the communicable area 4, the terminals 1*b* and 1*e* are located inside the proximity area 6, and the terminals 1*a* and 1*c* are located inside the external area 7. The terminal 1*c* (user C) and the terminal 1*e* (user E) are in-service-area specified depending on at least the relationship with the terminal 1*x* (user X) as indicated darkening.

In this case, because the terminal 1*a* and the terminal 1*c* are located in the external area 7, user A and user C are in the service area regardless of the specification of in-service-area. The terminal 1*b* is located in the proximity area 6 but not specified with in-service-area, so that user B is out of the service area. The terminal 1*e* is located in the proximity area 6 and specified with in-service-area, so that user E is in the service area.

Therefore, as shown in the bottom of FIG. 9, the display screen 2*x* of the terminal 1*x* shows user A, user C and user E as users in service area. With other users located in the proximity area 6, user X cannot execute a chat for example with user B but can execute a chat for example with user E.

FIG. 10 shows one example of the user interface processing to be executed by the control block 10 of the terminal 1*x* configured as shown in FIG. 1 when in-service-area is specified as described above.

The processing operations of step 41 through step 43 are the same as those of the example shown in FIG. 6. The processing to be executed when the determination in step 43 is Di≧Dr is the same as that of the example shown in FIG. 6. The processing operations of step 46 and subsequent steps are also the same as those of the example shown in FIG. 6.

In the example shown in FIG. 10, if Di<Dr is determined in step 43, namely, if this another terminal is found located in the proximity area 6, then the control block 10 of the terminal 1*x* goes to step 52 to determine whether this another terminal is specified with in-service-area.

If this another terminal is found specified with in-service-area, then the control block 10 goes from step 52 to step 45 to set an out-of-service-area flag to this another terminal, upon which the control block 10 goes to step 46.

In contrast, if this another terminal is found specified with in-service-area, the control block 10 goes from step 52 to step 44 to process this another terminal as in-service-area in the same manner as when Di≧Dr was determined in step 43, upon which the control block 10 goes to step 46.

Figure 11:
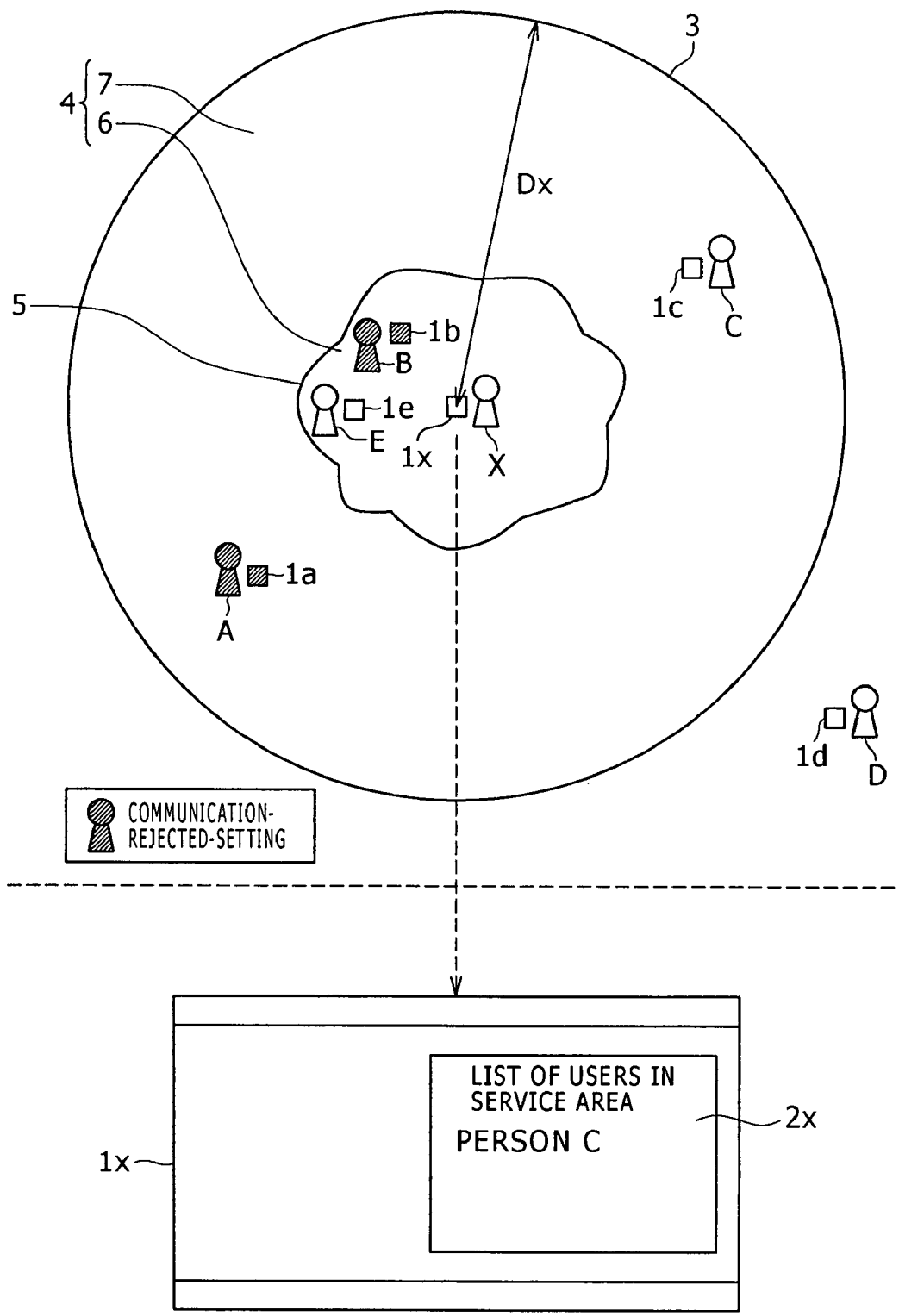
FIG. 11 illustrates one example of a user interface method.
Figure 12:
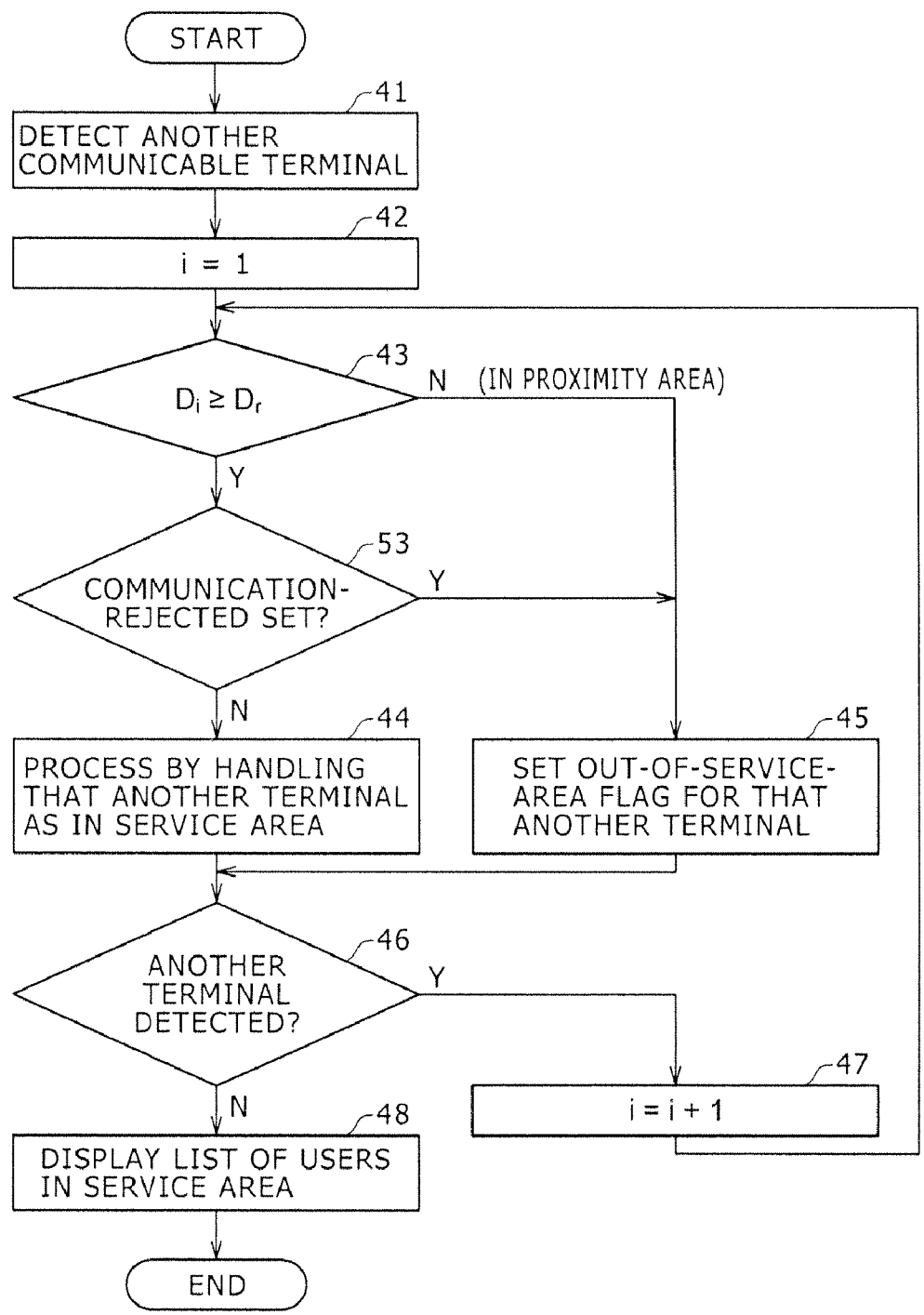
FIG. 12 illustrates a processing routine of the user interface method of FIG. 11.

2-2-3. Rejection Communication Setting: FIGS. 11 and 12

In the third case, rejected communication is set to a certain user (or terminal).

In this case, if rejected communication is set to this another terminal, the terminal 1*x* processes this another terminal as out-of-service area when this another terminal is located in the proximity area 6 as well as in the external area 7.

As with the above-described methods of out-of-service area specification and in-service-area specification, either of two methods is available. In method (3A), the user of another terminal specifies himself (or the own terminal) as rejected communication setting on another terminal. In method (3B), user X specifies particular another terminal as rejected communication setting on the terminal 1*x* in advance.

In the case of method (3A), receiving rejected communication setting information from this another terminal, the terminal 1*x* detects that this another terminal is a terminal specified with rejected communication setting; in the case of method (3B), comparing the terminal address of user ID (identification) received from another terminal with the rejected communication setting information on the terminal 1*x*, the terminal 1*x* determines whether this another terminal is a terminal specified with rejected communication setting.

FIG. 11 shows one example of the above-mentioned case. In this example, terminals 1*a*, 1*b*, 1*c* and 1*e* are located inside the communicable area 4, the terminals 1*b* and 1*e* are located inside the proximity area 6, and the terminals 1*a* and 1*c* are located inside the external area 7. The terminal 1*c* (user C) and the terminal 1*b* (user B) are rejected-communication-setting specified depending on at least the relationship with the terminal 1*x* (user X) as indicated darkening.

In this case, because the terminal 1*a* and the terminal 1*b* are specified with rejected-communication setting, user A and user B are out of the service area regardless whether located in the external area 7 or the proximity area 6. The terminal 1*c* is not specified with rejection-communication-setting and is located inside the external area 7, so that user C is in the service area. The terminal 1*e* not specified with rejected-communication-setting but is located in the proximity area 6, so that user E is out of the service area.

Therefore, as shown in the bottom of FIG. 11, the display screen 2*x* of the terminal 1*x* shows only user C as user in service area. User X cannot execute a chat for example with user A, B, or E but can execute a chat for example with user C.

FIG. 12 shows one example of user interface processing to be executed by the control block 10 of the terminal 1x configured as described in FIG. 1 when the rejected-communication-setting is specified as described above.

The processing operations of step 41 through step 43 are the same as those of the example shown in FIG. 6. The processing to be executed when the determination in step 43 is Di<Dr is the same as that of the example shown in FIG. 6. The processing operations of step 46 and subsequent steps are also the same as those of the example shown in FIG. 6.

In the example shown in FIG. 12, if Di≧Dr is determined in step 43, namely, if this another terminal is found located in the external area 7, then the control block 10 of the terminal 1x goes to step 53 to determine whether this another terminal is specified with rejected-communication-setting.

If this another terminal is found not specified with rejected-communication-setting, the control block 10 goes from step 53 to step 44 to process this another terminal as in service area and then goes to step 46.

In contrast, if this another terminal is found specified with rejected-communication-setting, then the control block 10 goes from step 53 to step 45 to set an out-of-service-area flag to this another terminal as with the determination of Di<Dr in step 43, upon which the control block 10 goes to step 46.

Figure 13:
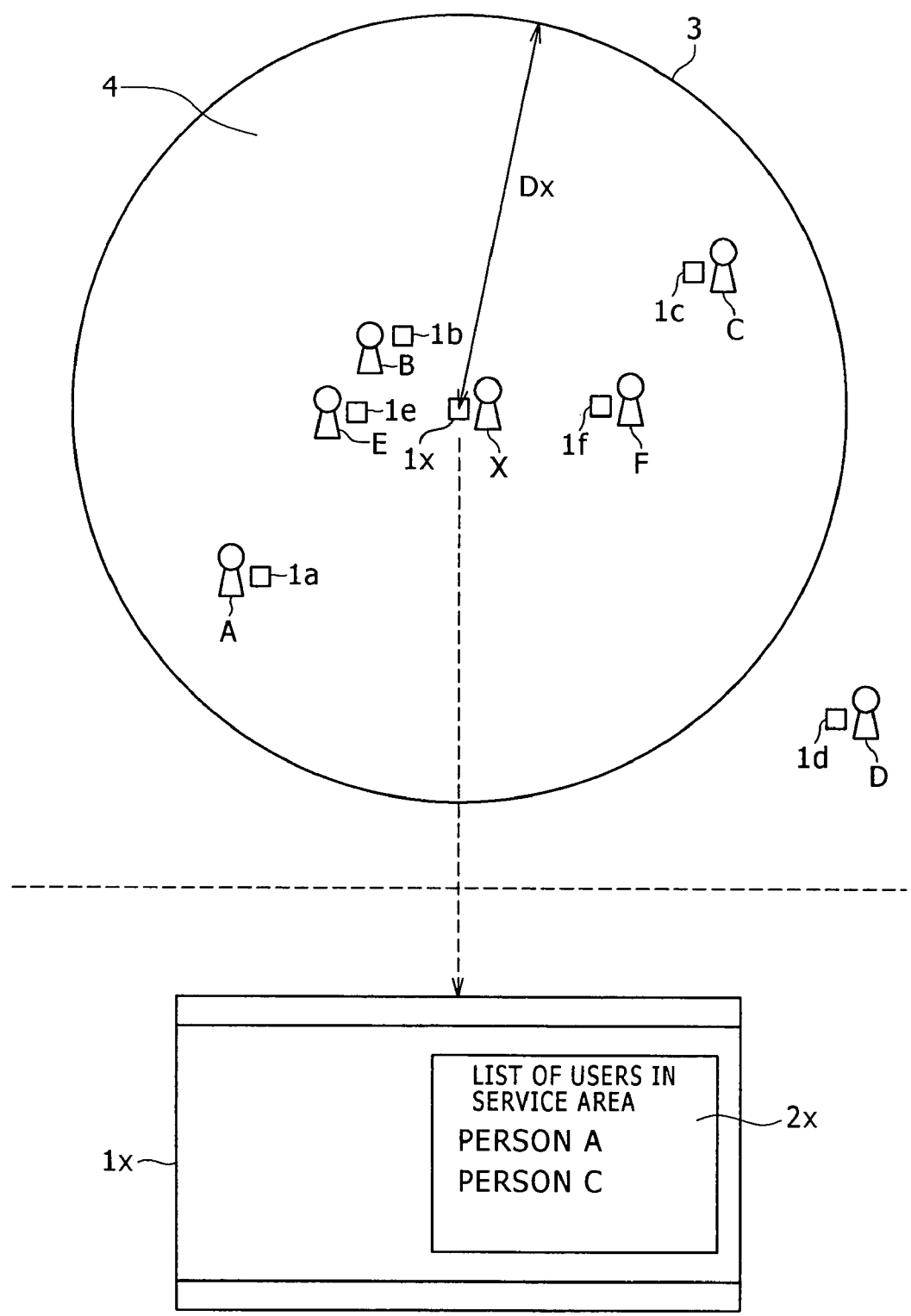
FIG. 13 illustrates one example of user interface method.
Figure 14:
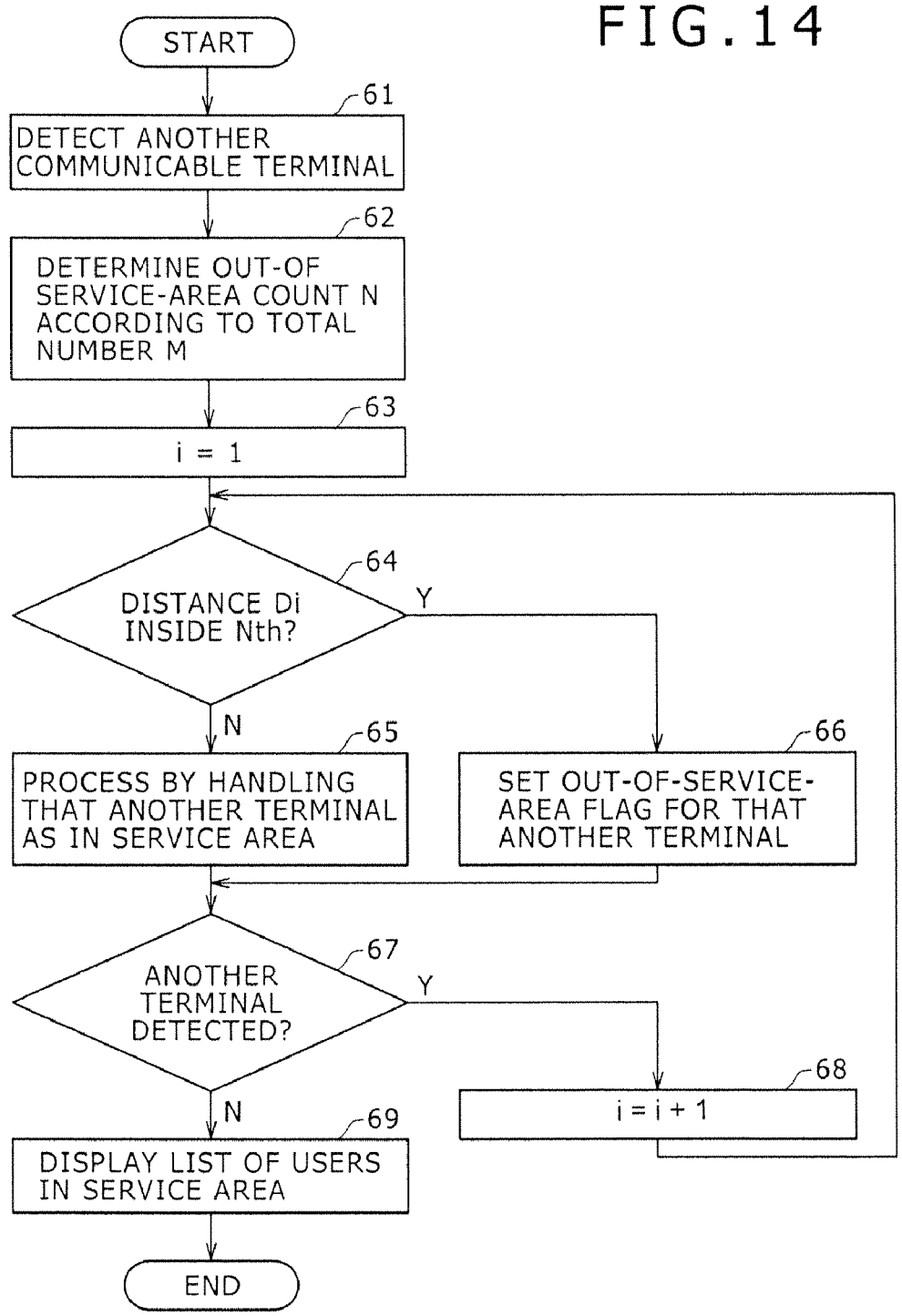
FIG. 14 illustrates a processing routine of the user interface method of FIG. 13.
Figure 15:
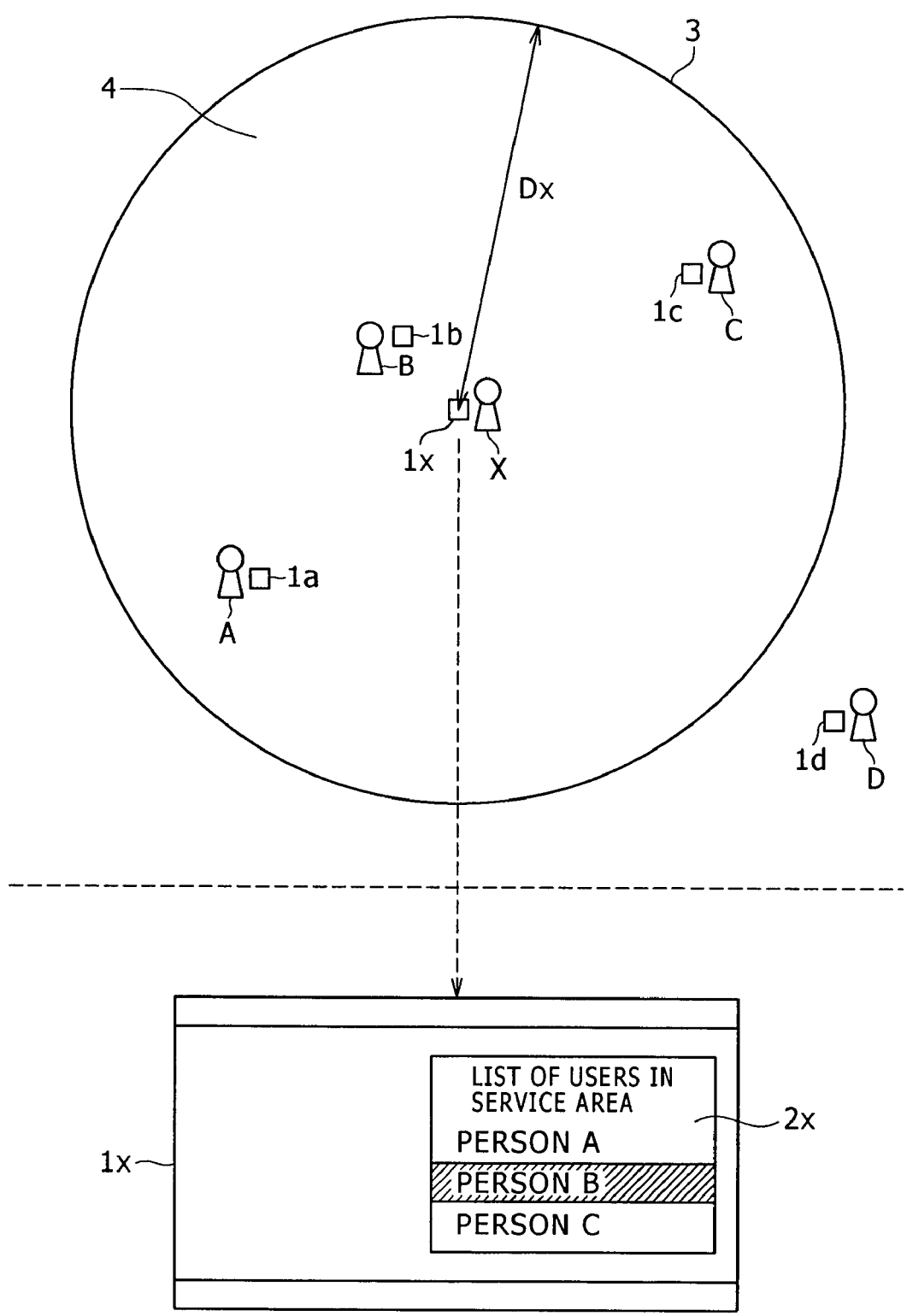
FIG. 15 illustrates a prior-art user interface method.

3. A Second Embodiment of the User Interface Method: FIGS. 13 and 14

In the above-described user interface method practiced as the first embodiment, the communicable area 4 is divided into the proximity area 6 and the external area 7. In the second embodiment, the communicable area 4 is not divided as shown in FIG. 13. Namely, N other terminals communicable with the terminal 1x are processed as out-of-service area, sequentially from the other terminals nearer to the terminal 1x. Other terminals other than these N terminals are processed as in-service-area.

In the case shown in FIG. 13, terminals 1a, 1b, 1c, 1e, and 1f are located inside the communicable area 4 and the distances between the terminal 1x and these terminals are Da, Db, Dc, De, and Df, respectively. Then, let Db<De<Df<Da<Dc and N=3, then, as shown in the bottom of FIG. 13, only user A and user C of the terminals 1a and 1c are displayed on the display screen 2x of the terminal 1x as in-service-area users and terminals 1b, 1e, and 1f are processed as out-of-service-area, user B, user E, and user F not being displayed.

Therefore, user X cannot select user B, user E, and user F as the mate of a chat for example.

If only a few users are located in the communicable area 4, it is highly possible for the locations of user X and users near thereto to be known by each other; if there are many users in the communicable area 4, there is little possibility for the locations of user X and users near thereto to be known by each other.

Therefore, it is desirable to stepwise change the number of terminals N to be processed as out-of-service-area in accordance with total M of other terminals detected as terminals communicable with the terminal 1x such that N increases as M decreases. For example, if M is lower than 10, then N=3; if M is equal to or higher than 11 and lower than 30, then N=2; and, if M is equal to or higher than 31, then N=1.

FIG. 14 shows one example of the above-described user interface processing to be executed by the control block 10 of the terminal 1x configured as shown in FIG. 1.

In step 61, the control block 10 of the terminal 1x detects another terminal that is located inside the communicable area 4 shown in FIG. 13 and communicable with the terminal 1x as with step 41 shown in FIG. 6 and, at the same time, detects a distance between the own terminal (terminal 1x) and the detected other terminals.

Then, the control block 10 of the terminal 1x goes to step 62 to determine the number of terminals N to be processed as out-of-service-area in accordance with the total number M of the detected terminals.

Next, in step 63, the control block 10 of the terminal 1x sets number i for the detected another terminal to 1 as with step 42 shown in FIG. 6 and goes to step 64 to determine whether distance Di between the i-th another terminal and the own terminal (terminal 1x) is within N in the ascending order.

If distance Di is found to be not within N in the ascending order, then the control block 10 of the terminal 1x goes to step 65 from step 64 to process this another terminal as in-service-area, upon which the control block 10 goes to step 67.

On the other hand, if distance Di is found to be within N on the ascending order, then the control block 10 goes from step 64 to step 65 to set an out-of-service-area flag to this another terminal and goes to step 67.

In step 67, the control block 10 determines whether there is any other detected terminal. If another detected terminal is found, then the control block 10 goes to step 68 to increment number i by 1 and returns to step 64 to repeat the above-described processing with the i-th another terminal after increment.

If there is any other detected terminal, then the control block 10 goes from step 67 to step 69 to display an in-service area user list on the display screen 2x depending on the results of processing executed so far.

The above-mentioned user interface processing is executed at certain time intervals.

Also, in this user interface method according to the second embodiment, the user interface processing routine may be configured such that, if the number of other terminals detected in step 61 is less than a predetermined value, three for example, all other terminals are processed as out-of-service-area. In addition, the terminal 1x (or each terminal) may be configured such that, checking the situation, user X sets the terminal 1x to the out-of-service-area mode for all the other terminals to be processed as out-of-service-area.

Further, each wireless terminal and the wireless network system may be configured so as to specify each terminal with out-of-service-area or in-service-area in the user interface method according to the second embodiment.

In order to configure each wireless terminal and the wireless network system for the specification of out-of-service area, only the terminals specified with out-of-service-area must be computed into the above-mentioned number N. Namely, of the terminals not specified with in-service-area, other terminals whose distances from the terminal 1x are within N in the ascending order are processed as out-of-service-area and the terminals not specified with out-of-service-area are processed as in-service-area if the distance from the terminal 1x is short.

In order to configure each wireless terminal and the wireless network system for the specification of in-service-area, the terminals specified with in-service-area are not computed into the above-mentioned number N. Namely, of the terminals not specified with in-service-area, the other terminals whose distances from the terminal 1x are within N in the ascending order are processed as out-of-service-area and the terminals specified with in-service-area are processed as in-service-area regardless of the distance from the terminal 1x.

The invention claimed is:

1. A method for presenting a user interface on a first terminal configured to wirelessly communicate with one or more other terminals, the method comprising:
   detecting at least a second terminal located inside a communicable area associated with said the first terminal;
   transmitting to at least the second terminal or receiving information from the at least the second terminal;
   determining whether the second terminal is located within a proximity area associated with the first terminal or located within an external area, wherein the external area is within the communicable area, but is external to the proximity area;
   if it is determined that the second terminal is located within the external area, displaying information associated with the second terminal on a display screen of the first terminal; and
   wherein the at least a second terminal comprises a plurality of other terminals, and;
   processing a terminal in the plurality of other terminals, which is located inside said external area, and is specified with a rejected-communication- setting, as an out-of-service-area terminal.

2. The method according to claim 1, wherein a boundary position between said proximity area and said external area is temporally varied.

3. The method according to claim 2, wherein said boundary position between said proximity area and said external area is temporally varied by random number.

4. The method according to claim 1, wherein, if a number of other terminals detected is fewer than a predetermined number of terminals, each of the detected other terminals is processed as an out-of-service-area terminal.

5. The method according to claim 1, wherein only a specially specified terminal of the at least a second terminal located inside the proximity area is processed as an out-of-service-area terminal.

6. The method according to claim 1, wherein a specially specified terminal of the at least a second terminal located inside the proximity area is displayed on the display screen of said first terminal as an in-service-area terminal.

7. A method for presenting a user interface on a first terminal configured to wirelessly communicate with one or more other terminals, the method comprising:
   detecting a plurality of other terminals located inside a communicable area associated with the first terminal; and
   transmitting to at least the second terminal or receiving information from the at least the second terminal; and
   processing N of the detected plurality of other terminals (N being a positive integer) near the first terminal, as out-of-service-area terminals; and
   displaying information associated with terminals in the detected plurality of other terminals that were not processed as out-of-service-area terminals on a display screen of the first terminal;
   wherein if the plurality of other terminals detected contains fewer than a predetermined number of terminals, and specified with a rejected-communication- setting, each of the plurality of other terminals detected are is processed as out of service-area terminal.

8. The method according to claim 7, wherein said N is varied stepwise in accordance with a total number M of other terminals detected such that said N is increased as the total number M is decreased.

9. A wireless terminal comprising:
   an information processing block configured to process information to be transmitted to at least another terminal or information received from the at least another terminal;
   a transmission/reception block configured to transmit said information processed by said information processing block to the at least another terminal and receive information from the at least another terminal; and
   a control block configured to:
   detect the at least another terminal located inside a communicable area associated with said wireless terminal,
   determine whether the at least another terminal is located inside a proximity area associated with the wireless terminal or located within an external area, wherein the external area is within in said communicable area, but is external to the proximity area as out of service area, and
   if it is determined that the second terminal is located within the external area, display information associated with the at least another terminal on a display screen of the wireless terminal;
   wherein said control block is further configured to process a terminal located inside said external area and specified with a rejected-communication-setting as an out-of-service-area terminal.

10. The wireless terminal according to claim 9, wherein a boundary position between said proximity area and said external area is temporally variable.

11. The wireless terminal according to claim 9, wherein, if a number of other terminals detected inside said communicable area is fewer than a predetermined number of terminals, each of the detected other terminals is processed as an out-of-service-area terminal.

12. The wireless terminal according to claim 9, wherein said control block is configured to process only a specially specified terminal located inside said proximity area as an out-of-service-area terminal.

13. The wireless terminal according to claim 9, wherein said control block is configured to display a specially specified terminal located inside said proximity area as an in-service-area terminal.

14. A wireless terminal comprising:
   an information processing block configured to process information to be transmitted to a plurality of other terminals or information received from the plurality of other terminals;
   a transmission/reception block configured to transmit said information processed by said information processing block to the plurality of other terminals or receive information from the plurality of other terminals; and
   a control block configured to:
   detect the plurality of terminals located inside said communicable area associated with the wireless terminal,
   process N (N being a positive integer) of the detected plurality of other terminals near said wireless terminal as out-of-service-area terminals, and
   display information associated with terminals in the detected plurality of other terminals that were not processed as out-of-service-area terminals on a display screen of said wireless terminal;
   wherein said control block is further configured to process a terminal located inside said external area and specified with a rejected-communication-setting as an out-of-service-area terminal.

15. The wireless terminal according to claim 14, wherein said N is varied stepwise in accordance with a total number M of other terminals detected by said control block such that said N is increased as the total number M is decreased.

16. A memory storing a program that when executed by at least one processor causes the processor to perform a method for presenting a user interface on a first terminal configured to wirelessly communicate with one or more other terminals, the method comprising:
   an information processing block configured to process information to be transmitted to a plurality of other terminals or information received from the plurality of other terminals;
   a transmission/reception block configured to transmit said information processed by said information processing block to the plurality of other terminals or receive information from the plurality of other terminals; and
   a control block configured to:
   detect the plurality of terminals located inside said communicable area associated with the wireless terminal,
   process N (N being a positive integer) of the detected plurality of other terminals near said wireless terminal as out-of-service-area terminals, and
   display information associated with terminals in the detected plurality of other terminals that were not processed as out-of-service-area terminals on a display screen of said wireless terminal:
   wherein said control block is further configured to process a terminal located inside said external area and specified with a rejected-communication-setting as an out-of-service-area terminal.

17. A memory storing a program that when executed by at least one processor causes the processor to perform a method for presenting a user interface on a first terminal configured to wirelessly communicate with a plurality of other terminals, the method comprising:
   an information processing block configured to process information to be transmitted to at least another terminal or information received from the at least another terminal;
   a transmission/reception block configured to transmit said information processed by said information processing block to the at least another terminal and receive information from the at least another terminal; and
   a control block configured to:
   detect the at least another terminal located inside a communicable area associated with said wireless terminal,
   determine whether the at least another terminal is located inside a proximity area associated with the wireless terminal or located within an external area, wherein the external area is within in said communicable area, but is external to the proximity area as out of service area, and
   if it is determined that the second terminal is located within the external area, display information associated with the at least another terminal on a display screen of the wireless terminal.
   wherein said control block is further configured to process a terminal located inside said external area and specified with a rejected-communication-setting as an out-of-service-area terminal.

* * * * *